United States Patent [19]

Imhoff

[11] Patent Number: 4,713,042
[45] Date of Patent: Dec. 15, 1987

[54] AUTOMATIC TRANSMISSION FOR A BICYCLE

[76] Inventor: Daniel Imhoff, 334 Cross St., Battle Creek, Mich. 49017

[21] Appl. No.: 843,326

[22] Filed: Mar. 24, 1986

[51] Int. Cl.[4] .............................................. F16H 9/26
[52] U.S. Cl. ........................................ 474/69; 474/70
[58] Field of Search ..................... 474/69, 70, 78–81; 74/750 B, 751, 752 B, 752 E; 280/236, 238

[56] References Cited

U.S. PATENT DOCUMENTS

| | | | |
|---|---|---|---|
| Re. 30,758 | 10/1981 | Lang | 474/80 |
| 3,540,309 | 11/1970 | Shimano et al. | 74/752 E |
| 3,830,521 | 8/1974 | Gardel et al. | 474/70 X |
| 3,831,978 | 8/1974 | Dunder et al. | 280/238 |
| 3,873,128 | 3/1975 | Dunder et al. | 280/238 |
| 3,926,020 | 12/1975 | Dantowitz et al. | 474/70 X |
| 3,969,948 | 7/1976 | Pipenhagen, Jr. | 474/50 |
| 3,995,508 | 12/1976 | Newell | 474/50 |
| 4,201,094 | 5/1980 | Rathmell | 474/70 |
| 4,277,986 | 7/1981 | Waddington | 74/750 B |
| 4,352,503 | 10/1982 | Cotter | 280/238 |
| 4,435,997 | 3/1984 | van Doorne | 74/796 |
| 4,447,068 | 5/1984 | Brooks | 280/238 X |
| 4,549,874 | 10/1985 | Wen | 474/69 |
| 4,571,219 | 2/1986 | Breden et al. | 474/70 |

OTHER PUBLICATIONS

Design Engineering, Mar., 1981, p. 32.
Technology Illustrated, p. 15, "Automatic Transmission—for Bicycles".

Primary Examiner—Stephen J. Novosad
Assistant Examiner—Thuy M. Bui
Attorney, Agent, or Firm—Flynn, Thiel, Boutell & Tanis

[57] ABSTRACT

An automatic transmission for a bicycle includes a rotatably supported wheel, an endless drive chain which is manually driven and held against axial movement relative to the wheel, a shift member which is rotationally and axially movable relative to the wheel and has thereon two axially spaced sprockets of different size which can each be engaged and driven by the chain, an arrangement responsive to the speed of the wheel for urging the shift member to move in respective axial directions as the wheel speed increases and decreases, and an arrangement responsive to the amount of force being applied by the cyclist for offering increased resistance to axial movement of the shift member in a direction which would upshift the transmission to a higher gear in response to an increase in bicycle speed. The arrangement responsive to the magnitude of the force applied by the cyclist also forces the transmission to downshift when the cyclist is applying a relatively large force to the pedals.

16 Claims, 10 Drawing Figures

AUTOMATIC TRANSMISSION FOR A BICYCLE

FIELD OF THE INVENTION

This invention relates to an automatic transmission for a bicycle and, more particularly, to such a transmission which controls shifting in response to the speed of the bicycle and also preferably in response to the force being applied to the pedals by the cyclist.

BACKGROUND OF THE INVENTION

Multi-speed bicycles which have several different gear ratios are very common, and the cyclist typically selects one of the gear ratios by operating a manual control. Manual shifting in this manner has several disadvantages, including the fact that it is a relatively slow way to change gears. Further, the cyclist must develop a great deal of skill in order to select the gear in which he or she can pedal most efficiently under the existing circumstances, and if the cyclist selects the wrong gear or fails to change gears as the cycling conditions change, the cyclist can become tired more rapidly than he or she should. Accordingly, attempts have been made to develop multi-speed transmissions for bicycles which automatically shift to a different gear when conditions warrant.

For example, U.S. Pat. Nos. 3,830,521, 4,435,997, 4,352,503, 3,926,020, 3,540,309, and 4,277,986, each disclose a transmission which is responsive to the speed of the vehicle for automatically varying the gear ratio being used. However, many of these transmissions are very complex and have parts which move continuously during normal use, thereby leading to frequent need for repairs. Moreover, a serious problem with transmissions of this type, which are responsive only to speed, is that under certain circumstances they make it very difficult for the cyclist to pedal. For example, if the bicycle is moving at a moderate to high speed and the transmission has therefore shifted to a higher gear, and if the cyclist then wishes to quickly accelerate or comes to a hill which must be ascended, it is necessary to slow the bicycle down in order to get the transmission to downshift to a gear which is more efficient for acceleration or climbing hills. Obviously, slowing of the speed of the bicycle makes no sense at all in either of these situations.

Above-mentioned U.S. Pat. No. 4,277,986 also discloses an alternative arrangement in which a bicycle transmission changes gears in response to the amount of force which the cyclist is applying to the pedals of the bicycle, or in other words the amount of rotational torque which the cyclist is attempting to apply to the rear wheel of the bicycle. Similar arrangements are disclosed in U.S. Pat. Nos. 3,969,948, 4,447,068, 3,995,508, 3,831,978, and Re. 30,758. Transmissions of this type are typically somewhat more practical than those which are responsive solely to the vehicle speed, but they are not completely satisfactory because they do not take into account the actual speed of the bicycle. Further, they tend to be relatively complex and to have many moving parts which move all the time, for example a plurality of small gears which are rotative continuously as the bicycle is pedaled, thereby making these arrangements subject to failure at an undesirably high rate.

It is therefore an object of the present invention to provide an automatic transmission for a manually propelled vehicle such as a bicycle which is simple and dependable and which will automatically and efficiently change gears in response to the speed of the vehicle and preferably also in response to the torque being manually applied by the operator.

A further object of the present invention is to provide a transmission, as aforesaid, which is relatively compact and has little or no relative movement between the parts thereof except at those points in time when the transmission is actually effecting a change in gearing ratios.

A further object of the present invention is to provide a transmission, as aforesaid, which is very rugged and requires minimal maintenance, and can be manufactured and assembled at a relatively low cost.

SUMMARY OF THE INVENTION

The objects of the invention, including those set forth above, are met according to one form of the invention by providing a vehicle drive apparatus which includes a wheel rotatably supported on the vehicle, and a shift member supported for rotation coaxially with the wheel and supported for movement axially with respect to the wheel between first and second positions, the shift member having axially spaced first and second sprockets thereon and the first sprocket being larger than the second sprocket. The drive apparatus also includes an arrangement for rotationally drivingly coupling the shift member to the wheel so that the wheel is rotated synchronously with the shift member in a forward direction, an arrangement responsive to the rotational speed of the wheel for urging the shift member to move in respective axial directions as the speed of the wheel increases and decreases, and an endless drive chain which is supported for lengthwise movement and is held against axial movement relative to the wheel, the chain drivingly engaging the first and second sprockets when the shift member is respectively in its first and second positions.

According to a different form of the invention, a drive apparatus for a manually propelled vehicle includes a wheel supported on the vehicle for rotation about an axis, a driving member which is movably supported on the vehicle and is manually moved, and a transmission arrangement for drivingly coupling the driving member to the wheel. The transmission arrangement includes a variable drive ratio arrangement which can vary a drive ratio at which the driving member is coupled to the wheel, an arrangement for sensing the rotational speed of the wheel and for urging the variable drive ratio arrangement to respectively decrease and increase the drive ratio in response to increases and decreases in the speed of the wheel, and an arrangement responsive to a torque applied by the driving member to the wheel through the transmission for resisting a decrease in the drive ratio by the variable ratio drive arrangement in response to an increase in the speed of the wheel.

BRIEF DESCRIPTION OF THE DRAWINGS

Preferred embodiments of the present invention are described in detail hereinafter with reference to the accompanying drawings. In the drawings.

DETAILED DESCRIPTION

Figure 1:
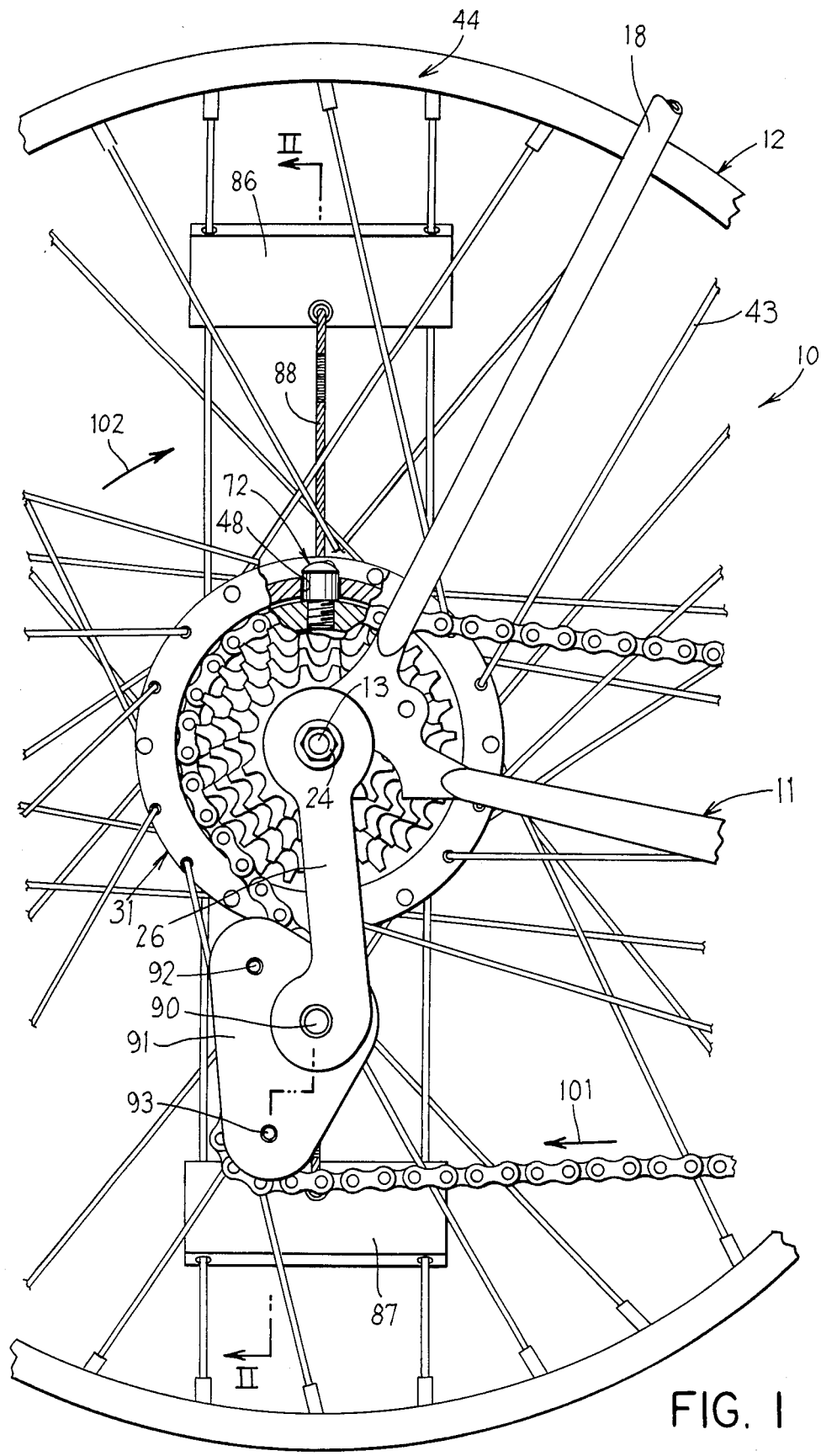
FIG. 1 is a fragmentary side view of a rear wheel and associated portions of a bicycle embodying the present invention.
Figure 2:
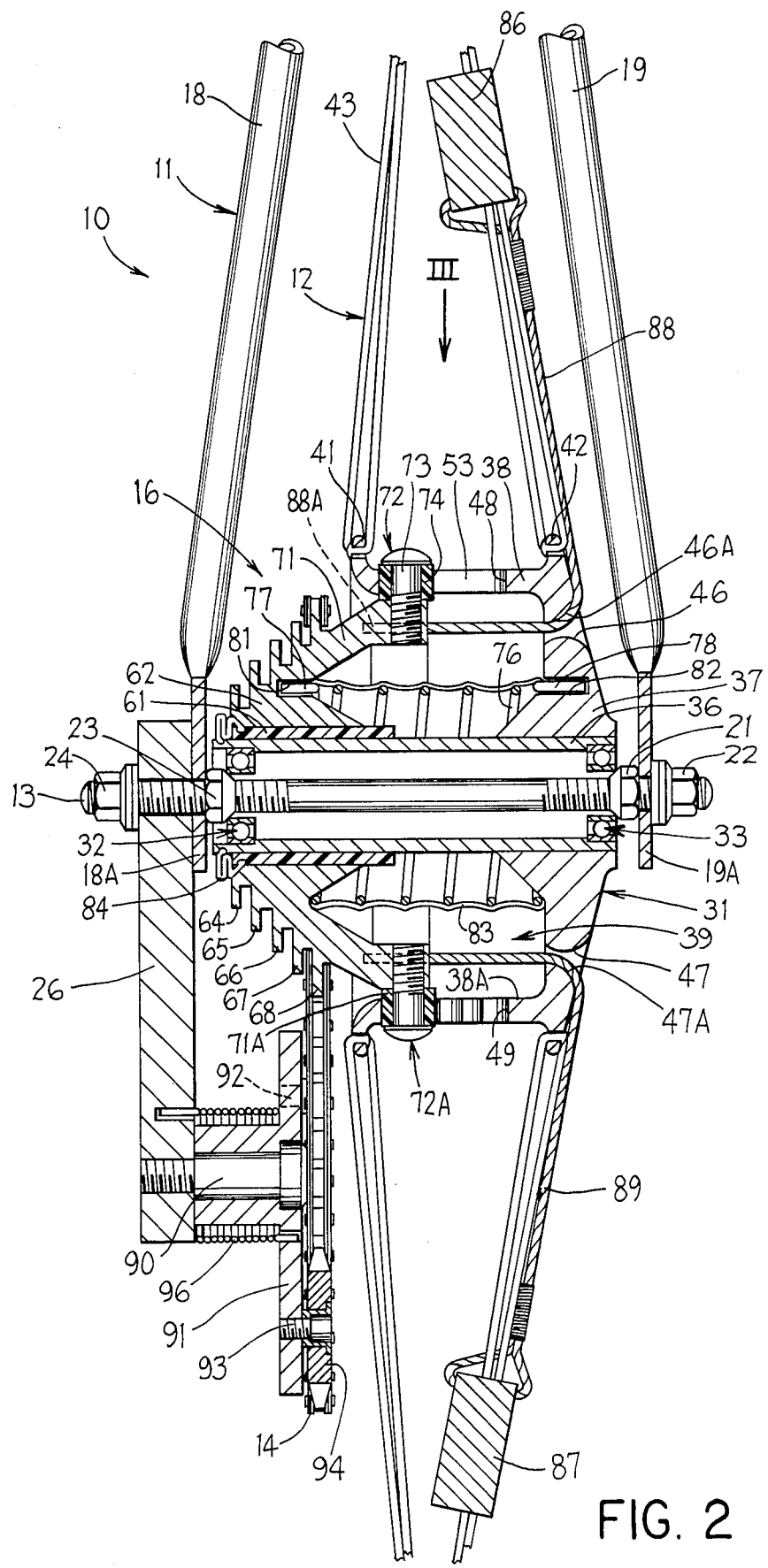
FIG. 2 is a sectional view taken along the line II—II of FIG. 1.

Referring to FIGS. 1 and 2, a bicycle 10 embodying the present invention includes a frame 11, a rear wheel 12 which is rotatably supported on the frame 11 by an axle 13, and an endless drive chain 14 which can rotatably drive the rear wheel 12 through a multispeed transmission 16 (FIG. 2).

The bicycle frame 11 includes two tubular frame parts 18 and 19 which extend downwardly from a not illustrated seat and have at their lower ends flattened portions 18A and 19A, the flattened portions 18A and 19A having holes therein through which the axle 13 extends. The axle 13 is threaded at each end, has nuts 21 and 22 which are threadably received on one end thereof and fixedly clamp the flattened portion 19A therebetween, and has nuts 23 and 24 which are threadably received on the opposite end thereof and fixedly clamp the flattened portion 18A and a chain tensioning bracket 26 therebetween.

The wheel 12 includes a hub 31 which is rotatably supported on the axle 13 by conventional roller bearings 32 and 33, and which is preferably made of aluminum. The hub 31 includes a spindle portion 36 which is a cylindrical sleeve coaxially encircling the axle 13 and supported at its opposite ends by the bearings 32 and 33, an annular flange portion 37 supported on and extending radially outwardly from one end of the spindle 36, and a cylindrical wall portion 38 which concentrically encircles the spindle 36 and has one axial end connected to the radially outer end of the flange 37, thus defining an annular recess 39 in the hub 31. The cylindrical wall portion 38 has small, radially outwardly projecting annular flanges 41 and 42 at opposite axial ends thereof, each of the annular flanges 41 and 42 having a plurality of axial openings therethrough which each receive one end of a respective one of a plurality of outwardly extending metal spokes 43. The wheel 12 also includes a conventional annular rim and tire 44 supported on the outer ends of the spokes 43.

The flange 37 of the hub 31 has two axial openings 46 and 47 therethrough at diametrically opposed locations, each of the openings 46 and 47 diverging in cross-sectional size in a direction toward the outside of the hub, the surface portions 46A and 47A of the openings 46 and 47 which face radially inwardly toward the axle 13 being guide surfaces which are smoothly curved and free of sharp edges.

Figure 3:
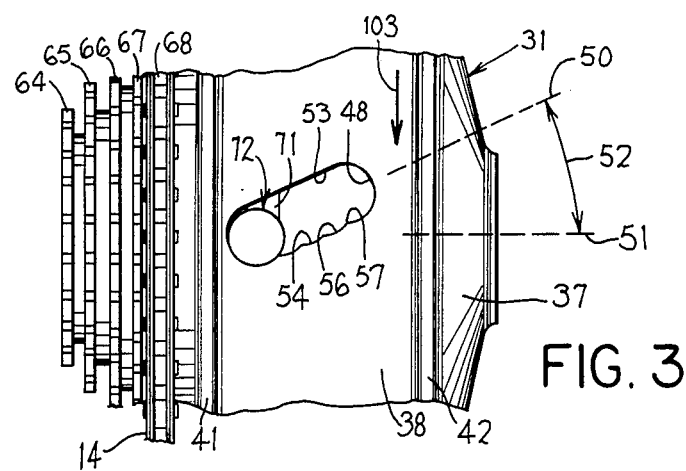
FIG. 3 is a fragmentary top view of a hub of the wheel 2 taken in the direction of the arrow III in FIG. 2.

The cylindrical wall 38 of the hub has two slots 48 and 49 therethrough at diametrically opposite locations thereon. The slots 48 and 49 are identical, and therefore only the slot 48 is described in detail. Referring to FIG. 3, the slot 48 has a centerline 50 which is skewed relative to the axle 13, and in particular forms an angle 52 of approximately 25° with respect to a line 51 which extends parallel to the axle 13 and intersects the centerline 50. The slot 48 has one side 53 which is substantially smooth, and its other side 54 has five shallow arcuate recesses 56 which are separated by pointed cams 57.

The transmission 16 includes a cylindrical shift member bushing 61 which is made of low friction plastic and which closely encircles and is axially movably and rotatably supported on the outer surface of the spindle 36 of the hub 31. An annular aluminum shift member 62 encircles and is fixedly supported on the bushing 61, and has thereon a sprocket cluster which includes five sprockets 64–68 which are axially spaced and increase progressively in diameter in an axial direction toward the flange 37 of the hub 31. The shift member 62 has an annular flange portion 71 which is inclined to extend radially outwardly and in an axial direction toward the flange 37 of the hub 31, the outer end of the annular flange portion 71 having a radially outwardly facing cylindrical surface 71A thereon which is closely adjacent the radially inwardly facing surface 38A on the cylindrical wall portion 38 of the hub 31.

The annular flange portion 71 of the shift member 62 has two pins 72 and 72A secured thereon and projecting radially outwardly from the surface 71A in diametrically opposite directions, each pin 72 and 72A being slidably received in a respective one of the slots 48 and 49 in the cylindrical wall portion 38 of the hub 31. Each of the pins 72 and 72A is defined by a screw 73 which engages a threaded bore extending radially into the annular flange portion 71 of the shift member 62, and a cylindrical bushing 74 which encircles the screw and is tightly clamped between the head of the screw and the surface 71A so as to be nonrotatable. The bushing 74 could, however, be rotatably supported on the screw 73. In the preferred embodiment, the bushing 74 is made of a hard synthetic material such as Delrin, and preferably has a radius substantially equal to the radius of each arcuate recess 56.

A helical compression spring 76 concentrically encircles the spindle 36 of the hub 31 and has its ends 77 and 78 bent to extend axially and disposed in axially extending openings 81 and 82 which are respectively provided in the shift member 62 and the flange portion 37 of hub 31. The spring 76 continuously and resiliently urges the shift member 62 and hub 31 to move axially apart, and also urges rotation of the shift member 62 relative to the hub 31 in a direction causing the pins 72 and 72A to engage the sides 54 of the slots 48 and 49 which have the arcuate recesses.

A sleevelike bellows seal 83 concentrically and closely encircles the spring 76 and has its ends respectively supported on the shift member 62 and the flange 37 of hub 31. A further sleevelike bellows seal 84 encircles the spindle 36 of hub 31 at the left end thereof in FIG. 2 and has its ends respectively supported on the left end of the spindle 36 and the left end of the bushing 61. The shift member 62 has a beveled surface 85 (FIG. 4) at the left end thereof in order to facilitate the support of one end of the bellows seal 84 on the left end of the bushing 61. The bellows seals 83 and 84 prevent dirt and other foreign matter from collecting on the exterior surface of the spindle portion 36 of hub 31, thereby ensuring smooth and reliable axial and rotational movement of the bushing 61 and shift member 62 relative to the spindle portion 36 of hub 31.

Referring to FIGS. 1 and 2, two centrifugal weights 86 and 87 are movably supported on the wheel 12 on diametrically opposite sides of the hub 31 and in angular alignment with the openings 46 and 47 in the hub 31, each of the weights 86 and 87 having two radially extending holes therethrough which slidably receive two parallel spokes 43, so that the weights 86 and 87 can each move radially inwardly and outwardly relative to the hub. In the preferred embodiment the weights 86 and 87 are made of aluminum and inherently serve as reflectors. These weights could, however, be alternatively made of plastic. An elongate, flexible metal cable 88 has one end secured to the weight 86, extends radially inwardly from the weight 86 to the hub 31, then extends slidably through the opening 46 in the hub 31 and in particular across the guide surface portion 46A thereof, then extends axially to the shift member 62, and has an end 88A which extends into an axially extending bore provided in the annular flange portion 71 of shift member 62 and is secured in the bore in any conventional manner, for example by a not illustrated setscrew disposed in a threaded opening which is perpendicular to and intersects the bore which receives the end 88A of the cable 88. A similar metal cable 89 is connected to the weight 87, extends through the opening 47 in hub 31, and is connected to the annular flange portion 71 of shift member 62 in a like manner.

The chain tensioning bracket 26, which is held against rotation relative to the axle 13 by virtue of being firmly clamped between the nuts 23 and 24, has secured to its lower end a screw 90 which is parallel to the axle 13 and pivotally supports an idler support member 91. The idler support member 91 has two axles 92 and 93 thereon, and the axles 92 and 93 each rotatably support a respective idler gear over which the drive chain 14 extends, only one of the idler gears (94 in FIG. 2) being clearly visible in the drawings. The tensioning bracket 26 and idler support member 91 hold the drive chain in a substantially fixed axial position with respect to the axle 13, shifting of the drive chain 14 between the various sprockets 64–68 being effected by axial movement of the shift member 62 relative to the axle 13 in a manner described in more detail hereinafter. A helical torsion spring 96 (FIG. 2) urges the idler support member 91 to pivot about the axle 90 relative to the tensioning bracket 26 so that, as the drive chain 14 is shifted between the sprockets 64–68, which have different diameters, the chain will be kept tensioned and will not have any slack.

The pins 72 and 72A cooperate with the slots 48 and 49 to limit axial movement of the shift member 62. In particular, the shift member 62 can move axially between two end positions in which the gears 64 and 68 are respectively axially aligned with the chain 14 and the pin 72 is respectively at the right and left ends of the slot 48. Further, when each of the gears 64 through 68 is in a position of axial alignment with the chain 14, each of the pins 72 and 72A is axially aligned with a respective one of the arcuate recesses 56 in the associated slot 48 or 49.

The drive chain 10 is driven by an arrangement which is entirely conventional and therefore not illustrated. In particular, a conventional pedal crank is rotatably supported on the bicycle frame and can be rotated by the feet of the cyclist, the pedal crank being coupled by a conventional free-wheeling clutch to a drive sprocket which the drive chain 14 extends around. When the cyclist is rotating the pedal crank in a forward direction at a speed equal to the speed of the drive sprocket for the chain 14, the free-wheeling clutch operatively couples the pedal crank to the drive sprocket so that the chain 14 is driven in the direction indicated by arrow 101 in FIG. 1, which in turn causes the wheel 12 to be rotated in the direction of the arrow 102 in FIG. 1 and the arrow 103 in FIG. 3. When the drive sprocket is rotating faster than the pedal crank, the free-wheeling clutch permits the drive sprocket to freely overrun the pedal crank. In other words, the cyclist can stop moving the pedal crank while the bicycle is moving, and the drive chain 14 and drive sprocket will continue to move. U.S. Pat. Nos. 3,492,883 and 4,183,262 each disclose a conventional drive arrangement suitable for use in the bicycle disclosed in the present application, including a pedal crank and main drive sprocket coupled by a free-wheeling clutch, and the disclosure of these two patents is hereby incorporated herein by reference. If desired, the main drive sprocket could optionally have two sprockets thereon of different diameter and the chain 14 could be switched between them in a conventional manner by a conventional manually controlled derailleur mechanism.

Figure 4:
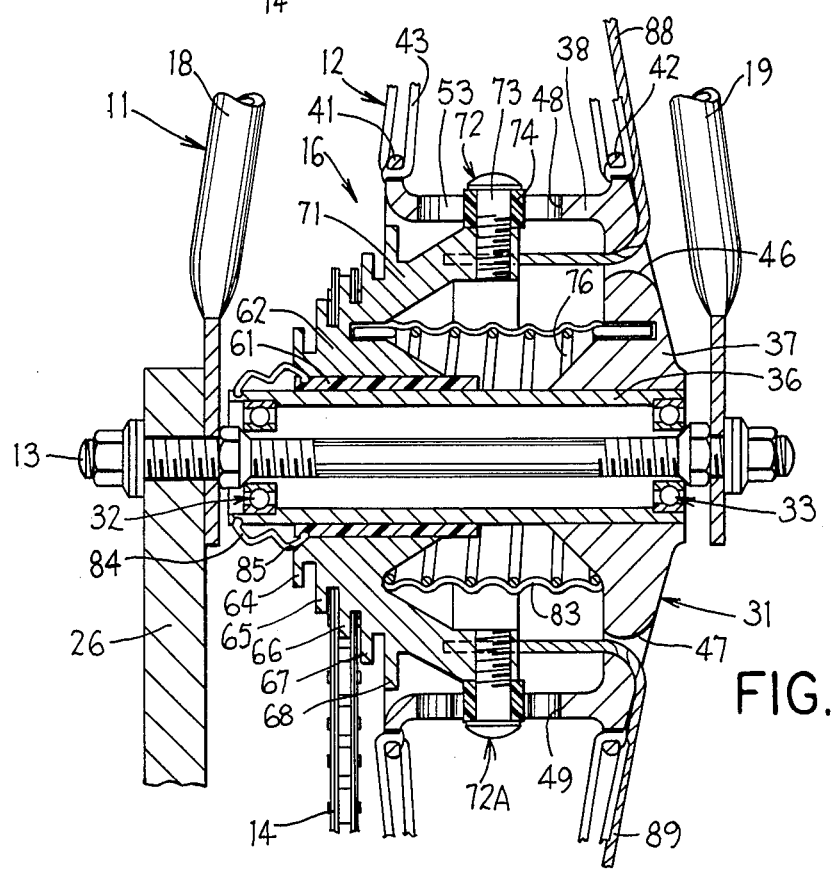
FIGS. 4 and 5 are views which are respectively similar to FIGS. 2 and 3 but show a different operational position.
Figure 5:
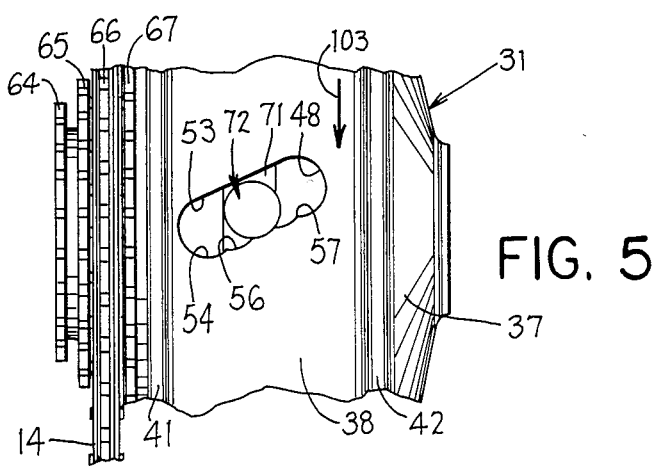
Figure 6:
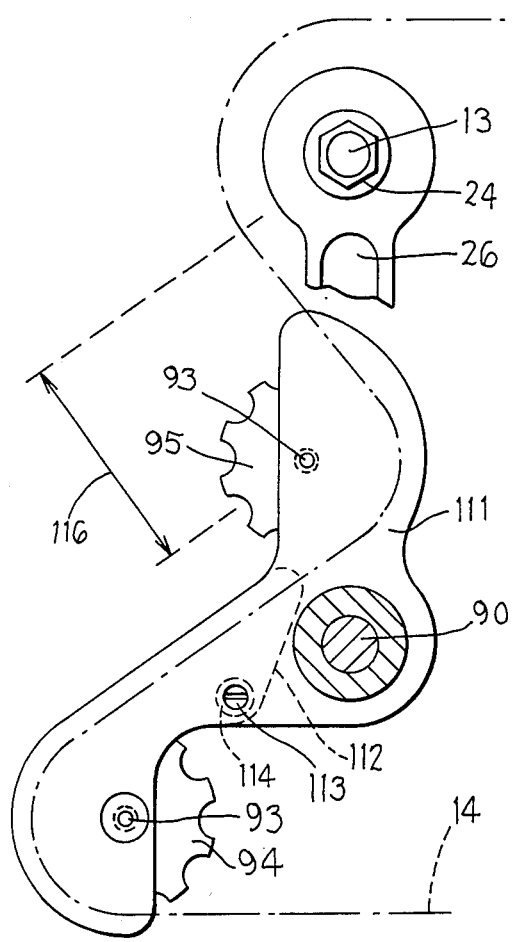
FIG. 6 is a fragmentary side view of an alternative embodiment of a chain tensioner which is a component of the embodiment of FIG. 1.
Figure 7:
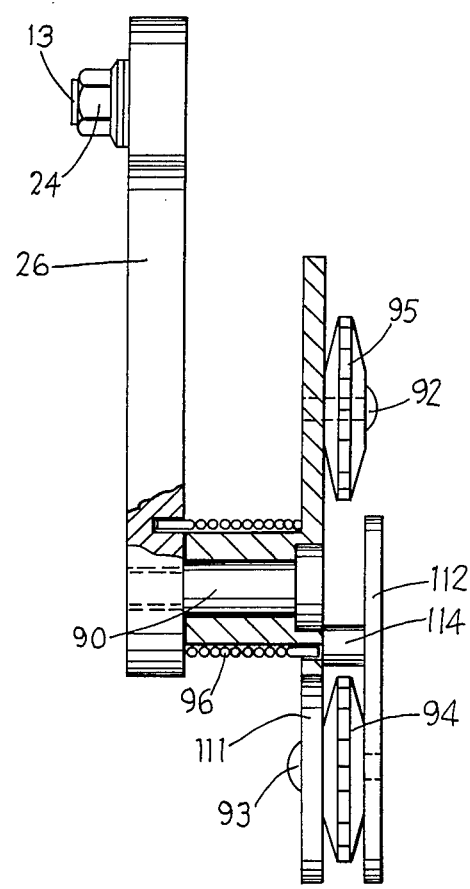
FIG. 7 is a fragmentary front view of the chain tensioner of FIG. 6.

FIGS. 6 and 7 illustrate an alternative embodiment of the chain tensioning arrangement disclosed in the embodiment of FIGS. 1–5. Parts which are functionally and structurally identical to those of FIG. 5 are designated by the same reference numerals. The chain tensioner of FIGS. 6 and 7 includes a chain tensioning bracket 26 which is fixedly clamped in place by a nut 24 on the axle 13, and which has at its lower end an axle 90 which pivotally supports an idler support 111 having a shape which is best seen in FIG. 6. The idler support is biased rotationally relative to the bracket 26 by a spring 96. Two idler gear axles 92 and 93 are provided on the idler support member 111, and rotatably support respective idler gears 95 and 94. A retention plate 112 is provided on the side of the idler gear 94 remote from the idler support 111, and the axle 93 and a screw 113 extend from the idler support member 111 to the retention plate 112 and threadedly engage threaded openings therein in order to hold the retention plate 112 fixedly in position. A bushing 114 encircles the screw 113 and has its ends respectively disposed against the idler support 111 and retention plate 112 in order to maintain a proper spacing therebetween. The retention plate 112 ensures that the drive chain 14, which is shown diagrammatically in FIG. 6, does not jump off the the idler gears 94 and 95 during shifting. The path of movement of the axle 92 for the idler gear 95 about the axle 90 is such that the distance 116 along the chain 14 between the points of tangency of the chain 14 with the gear 95 and with each of the sprockets 148–153 is approximately the same in each gear, and in particular is approximately equal to the length of a portion of the chain having four links. Maintaining this uniform tangential distance approximately equal to four chain links is a conventional technique which provides optimum shifting action.

Figure 8:
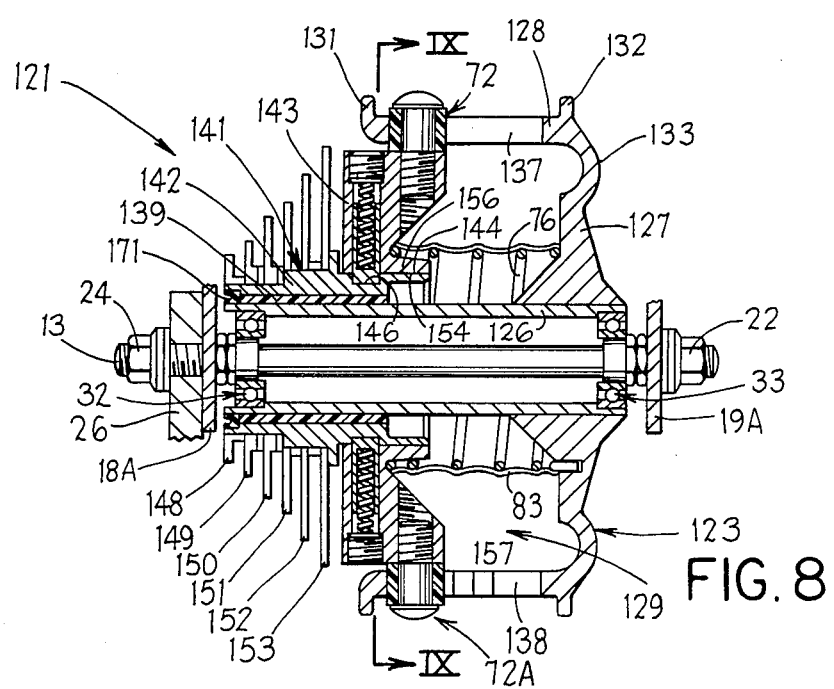
FIG. 8 is a fragmentary sectional front view similar to FIG. 2 but showing an alternative embodiment of a transmission illustrated in FIG. 2.
Figure 9:
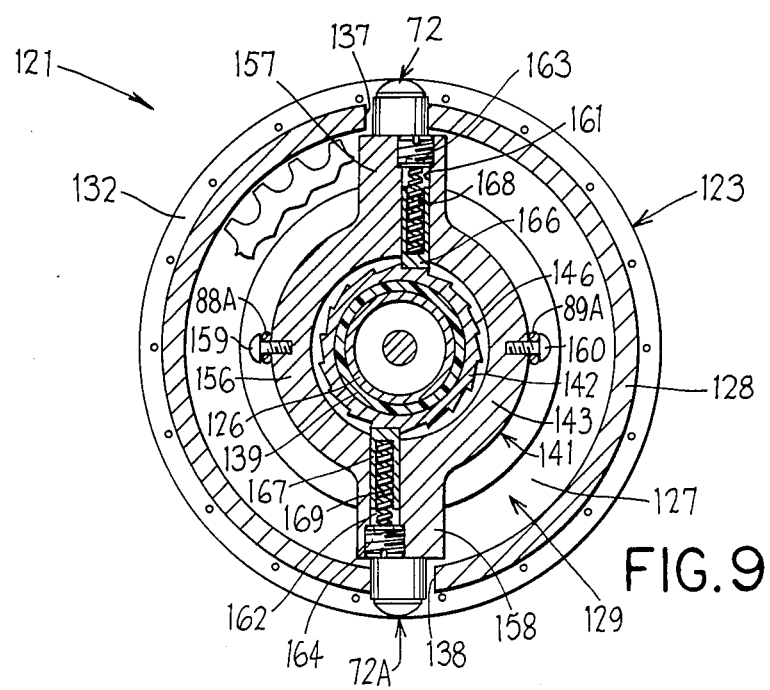
FIG. 9 is a sectional view taken along the line IX—IX in FIG. 8.

FIGS. 8 and 9 show a transmission 121 which is an alternative embodiment of the transmission 16 illustrated in FIGS. 1–5. Parts which are functionally and structurally equivalent to parts in the embodiment of FIGS. 1–5 are designated with the same reference numerals used in FIGS. 1–5. The following description is directed primarily to the differences between the transmission 121 and the transmission 16.

The transmission 121 includes a hub 123, the hub 123 including a spindle 126 which is rotatably supported on the axle 13 by the bearings 32 and 33, a radially outwardly extending flange 127 at the rightward end of the spindle 126, and a cylindrical wall 128 which concentrically encircles the spindle 126 and is fixedly secured to the radially outer end of the flange 127, the region between the spindle 126 and cylindrical wall 128 being an annular recess 129. The cylindrical wall 128 has two axially spaced, annular flanges 131 and 132 to which the spokes of the bicycle wheel are connected. The flange 127 has on the outwardly facing side thereof an annular boss 133 of approximately semi-circular cross section and has two openings 134 (FIG. 10) therethrough at diammetrically opposed locations, only one of the openings 134 being visible in FIG. 10. The openings 134 are each approximately conical and converge in a direction toward the recess 129, each opening 134 being provided adjacent the radially inner edge of the boss 133 so that a portion of the conical surface of each opening 134 merges smoothly with the semi-cylindrical surface of the boss 133. The cylindrical wall 128 has two slots 137 and 138 therein which are effectively identical to the slots 48 and 49 in the embodiment of FIGS. 1-5, except that each slot 137 and 138 has six arcuate recesses along one side thereof rather than five recesses.

A plastic bushing 139 concentrically encircles and is axially slidably supported on the spindle 126, and a shift member 141 encircles and is fixedly supported on the bushing 139. The shift member 141 includes two separate parts 142 and 143, the shift member part 142 having a radially outwardly facing cylindrical surface 144 thereon, and the surface 144 having a circumferential groove with an outwardly facing saw tooth surface 146 (FIG. 9) therein. The shift member part 142 has six sprockets 148–153 of progressively increasing diameter supported thereon.

Figure 10:
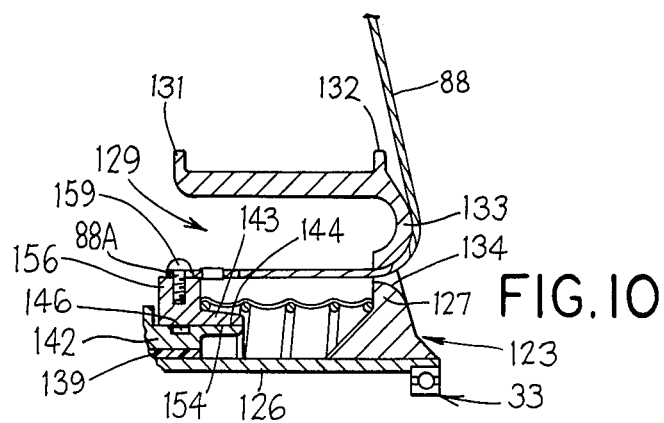
FIG. 10 is a fragmentary sectional top view of a portion of the transmission shown in FIG. 8.

The shift member part 143 has a radially inwardly facing cylindrical surface 154 thereon which slidably engages the cylindrical surface 144, and the shift member part 143 is therefore capable of rotation relative to and independently of the shift member part 142. The shift member part 143 includes an annular portion 156 (FIG. 9) which concentrically encircles the shift member part 142, and has two projections 157 and 158 which extend radially outwardly from the annular portion 156 on diammetrically opposite sides thereof, the outer end of each projection 157 and 158 being adjacent the cylindrical wall 128 of the hub 123. Pins 72 and 72A are respectively secured in threaded openings provided in the projections 157 and 158, and are respectively slidably disposed in the slots 137 and 138. The shift member part 143 also includes two screws 159 and 160 which engage threaded openings provided on diammetrically opposite sides of the annular portion 156, which are each offset by 90° from each of the projections 157 and 158, which are each approximately angularly aligned with a respective one of the conical openings 134 in the hub 123, and which each secure to the shift member part 143 the end 88A or 89A of a respective one of the flexible metal cables which are connected to the centrifugal weights, each cable extending around the approximately semi-cylindrical surface of the boss 133 and through a respective one of the conical openings 134 as shown in FIG. 10. The purpose of the boss 133 is to provide curved surfaces for the cables 88 and 89 to slide on which have a larger effective radius than the corresponding curved surfaces in the embodiment of FIGS. 1-5, in order to minimize wear of the cables produced by flexing thereof.

As shown in FIG. 9, each of the projections 157 and 158 has a respective bore 161 or 162 extending radially therethrough, the radially outer ends of the bores 161 and 162 being threaded and having respective threaded screw studs 163 and 164 therein. Respective cylindrical ratchet elements 166 and 167 are each radially movably supported in the radially inner end of a respective one of the bores 161 and 162, and helical compression springs 168 and 169 are each disposed in a respective one of the bores 161 and 162, have one end disposed against a respective one of the studs 163 and 164, and have their opposite ends disposed in blind openings provided in the ratchet elements 166 and 167 so as to yieldably urge the ratchet elements radially inwardly so that the radially inner end of each is disposed in the circumferential groove in the shift member part 142 and engages the saw tooth surface 146 therein. The ratchet elements 166 and 167 thus prevent relative axial movement of the shift member parts 142 and 143, and through cooperation with the saw tooth surface 146 permit rotation of the shift member part 143 in only one direction relative to the shift member part 142.

As in the embodiment of FIGS. 1-5, the shift member 141 is urged leftwardly and rotationally in FIG. 8 by a helical torsion spring 76 which is surrounded by a bellows seal 83. An annular wiper seal 171 is secured to the left end of the shift member part 141 and slides axially along the spindle 126 with the shift member part 141 and bushing 139.

OPERATION

The following explanation of operation begins with the bicycle 10 motionless and the transmission 16 in the operational position shown in FIGS. 2 and 3, in which the shift member 62 is in its leftmost position with the pins 72 and 72A at the left ends of the slots 48 and 49, and in which the drive chain 14 is engaging the largest sprocket 68 on the shift member 62. Since the sprocket 68 will cause a smaller amount of angular movement of the wheel 12 than the sprockets 64–67 in response to a given amount of lengthwise movement of the chain 14, the sprocket 68 serves as the "low" gear which creates the highest drive ratio, whereas the gear 64 serves as the "high" gear which creates the lowest drive ratio. The cyclist then applies forces to the pedals of the bicycle which cause the chain 14 to move in the direction of the arrow 101 in FIG. 1, the engagement of the chain 14 with the sprocket 68 causing the shift member 62 to rotate in the direction of the arrow 103 in FIG. 3, the pins 72 and 72A each being urged into engagement with the leftmost arcuate recess 56 in the associated slot 48 or 49 so as to cause rotation of the wheel hub 31 synchronously with the shift member 62. Of course, the entire wheel 12 rotates with its hub 31, thereby propelling the bicycle.

As the bicycle 10 accelerates and the rotational speed of the wheel 12 progressively increases, progressively increasing centrifugal forces are produced by the weights 86 and 87, and these radially outwardly directed forces are converted by the cables 88 and 89 into axial forces which are applied to the shift member 62 and urge it to move rightwardly in FIG. 2 against the force of the spring 76. In other words, the weight 86 and 87, the cables 88 and 89, and the spring 76 serve as an arrangement which responds to increases and decreases in the rotational speed of wheel 12 by urging the shift member 62 to respectively move axially rightwardly and leftwardly, rightward and leftward axial movement of shift member 62 respectively effecting an increase and a decrease in the current drive ratio of the transmission.

While the bicycle is accelerating, the cyclist will be exerting strong forces on the pedals in order to cause the bicycle to accelerate and this will cause each of the pins 72 and 72A to be firmly urged into engagement with the leftmost arcuate recess 56 in the associated slot 48 or 49. Further, the angle 52 at which the slots 48 and 49 are arranged requires that, in order for the shift member 62 to move rightwardly so that the pins 72 and 72A move rightwardly in the slots 48 and 49, the shift member 62 must rotate slightly relative to the hub 31 in a direction against the forces which the cyclist is applying to the shift member 62, or in other words in a direction opposite the arrow 103 in FIG. 3. Therefore, when the cyclist is exerting large forces on the pedals and thus applying a large amount of torque to the transmission 16, the cams 57 between the arcuate recesses 56 and the inclination of the slots 48 and 49 make it very difficult for the pins 72 to move rightwardly within the slots 48 and 49. Accordingly, even when the rear wheel 12 has reached a speed at which the centrifugal weights 86 and 87 and the cables 88 and 89 are exerting a rightward axial force on the shift member 62 which is greater than the leftward force exerted by the spring 76, the shift member 62 will not be able to move rightwardly if the cyclist is exerting large forces on the pedals, which keeps the drive chain in engagement with the largest sprocket 68 and thus provides the highest drive ratio in order to permit the cyclist to accelerate as quickly as possible. In other words, the pins 72 and 72A and the slots 48 and 49 serve as an arrangement responsive to increased torques applied by the cyclist for offering increased resistance to rightward movement of the shift member 62 which would shift the transmission 16 to a higher gear and thus a lower drive ratio. When the cyclist thereafter pedals with less force or stops pedaling altogether, the centrifugal weights and the cables 88 and 89 will be able to pull the shift member 62 rightwardly against the force of the spring 76, for example to the position shown in FIGS. 4 and 5, the amount of axial movement of the shift member 62 depending on the magnitude of the radially outward forces produced by the weights 86 and 87, which is of course proportional to the speed of the wheel. Since the chain 14 is held in a substantially fixed axial position, this rightward movement of the shift member 62 will cause the moving chain 14 to shift to and drivingly engage a different one of the sprockets 64–68. In FIG. 4, the shift member 62 has been moved to a position in which the chain 14 is aligned with and engaging the center sprocket 66 and in which the pins 72 and 72A are each aligned with the center arcuate recess 54 in the associated slot 48 or 49.

When the cyclist resumes pedaling, he will be in a higher gear having a lower drive ratio, and if he is applying large forces to the pedals and thus applying a large torque to the transmission 16, the pins 72 and 72A and slots 48 and 49 will tend to inhibit further rightward movement of the shift member 62 so long as the cyclist continues to apply large forces to the pedals.

If, when the mechanism is in the position shown in FIGS. 4 and 5, the cyclist suddenly applies very large forces to the pedals, for example because he wants to accelerate quickly or because he has reached and started to ascend a hill, the inclination of the slots 48 and 49 and the added force applied in the direction of the arrow 103 by the pins 72 and 72A will cause the pins 72 and 72A to slide leftwardly over the adjacent cams 57 and thereby move the shift member 62 leftwardly against the forces produced by the centrifugal weights 86 and 87. The leftward movement of the shift member 62 causes the drive chain 14 to shift to a larger one of the sprockets 64–68, or in other words to a lower gear having a higher drive ratio. In other words, even though the speed of the bicycle has not changed, the pins 72 and 72A and the slots 48 and 49 again respond to applied torque and cause the transmission 16 to downshift as a result of the increased force applied to the pedals, so that the cyclist can more comfortably accelerate or climb a hill.

Referring again to the operational position shown in FIGS. 4 and 5, a decrease in the speed of the bicycle will reduce the rightwardly directed forces applied to the shift member 62 by the centrifugal weights 86 and 87, so that the shift member 62 will try to move leftwardly under the urging of the spring 76. If the cyclist is applying a normal pedaling force to the pedals, the cam 57 to the immediate left of and engaging each of the pins 72 and 72A will have a tendency to keep the pins 72 and 72A and thus the shift member 62 from moving leftwardly so long as the cyclist continues to continuously apply the normal pedaling force to the pedals. Of course, if the speed of the bicycle continues to decrease, the leftward force exerted on the shift member 62 by the spring 76 will progressively increase and may ultimately be sufficiently large to move the shift member 62 leftwardly despite the fact that the cyclist is exerting a normal pedaling force. In any event, if the cyclist stops pedaling and the bicycle begins to slow down, the torsion force exerted by the spring 76 will cause the shift member 62 and the pins 72 and 72A to be rotationally urged in the direction of the arrow 103 relative to the hub 31, so that the pins 72 and 72A continue to engage the arcuate recess side 54 of the slots 48 and 49, thereby providing a detent action which tends to ensure that the idler gears and chain 14 are always directly axially aligned with one of the sprockets 64–68 on the shift member 62, or in other words causing the axial urging of the spring 76 to move the shift member 62 leftwardly in discrete steps, thereby ensuring a quieter and smoother downshifting action as the bicycle slows.

The operation of the chain tensioner shown in FIGS. 6 and 7 is so similar to the operation of the chain tensioner of FIGS. 1–5, that no separate explanation thereof is believed necessary.

The transmission 121 shown in FIGS. 8–10 will, during normal use, operate substantially the same as described above for the transmission 16. When the cyclist exerts a force on the pedals, the shift member part 142 will be caused to rotate clockwise in FIG. 9, and engagement of the saw tooth surface 146 with the ratchet elements 166 and 167 will cause the shift member part 143 to be rotated synchronously with the shift member part 142. If the cyclist stops pedaling, the freewheeling clutch provided between the pedal and the drive chain will permit the drive chain to continue to move as the rear wheel of the bicycle rotates. Consequently, the shift member part 143 will typically not rotate relative to the shift member part 142 during normal operation.

The provision of the separate shift member parts 142 and 143 and the ratchet arrangement therebetween is a safety feature which is utilized only in an emergency situation where something suddenly interferes with movement of the chain while the bicycle is in motion. For example, assume that the cyclist is coasting down a hill, and his or her pant leg gets caught between the drive chain and the sprocket at the pedals, thereby abruptly stopping movement of the chain, which in turn locks the shift member part 142 in a fixed angular position. The ratchet arrangement in the embodiment of FIGS. 8-10 permits the rear wheel of the bicycle to continue to freely rotate, thereby avoiding a very dangerous situation, the radially inner ends of the ratchet elements 166 sliding over the teeth of the saw tooth surface 146 as the hub 123 and shift member part 142 rotate in a clockwise direction in FIG. 3 around the stationary shift member part 142.

Although preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A drive apparatus for a manually propelled vehicle, comprising: a wheel supported on said vehicle for rotation about an axis; a driving member which is movably supported on said vehicle and is moved in response to manually applied forces; and transmission means for drivingly coupling said driving member to said wheel, said transmission means including variable drive ratio means for varying a drive ratio at which said driving member is drivingly coupled to said wheel within a range bounded, by an upper limit and a lower limit, means responsive to the rotational speed of said wheel and operatively coupled to said variable drive ratio means for urging said variable drive ratio means to respectively decrease and increase said drive ratio in response to increases and decreases in the speed of said wheel, and means responsive to a torque applied by said driving member to said wheel through said transmission means for resisting a decrease in said drive ratio by said variable drive ratio means in response to an increase in the speed of said wheel.

2. The drive apparatus according to claim 1, wherein said wheel includes a hub having a a cylindrical wall concentrically encircling the axis of said wheel, said cylindrical wall having a slot therein which extends approximately axially; wherein said variable ratio drive means includes a shift member supported for rotation coaxially with and independently of said wheel and for movement axially of said wheel between first and second positions; wherein said torque responsive means includes an approximately radially extending pin provided on said shift member and slidably disposed in said slot; and wherein said transmission means includes means for drivingly coupling said driving member to said shift member in a manner effecting rotation of said shift member about said axis in a forward direction in response to movement of said driving member in a driving direction, rotation of said shift member causing said pin to engage one side of said slot in said hub and to effect rotation of said wheel synchronously with said shift member.

3. The drive apparatus according to claim 2, wherein said shift member includes first and second shift member parts which are supported for rotation relative to each other and are fixed against relative axial movement, and includes ratchet means for respectively permitting and preventing rotation of said first shift member part in said forward direction and in a reverse direction opposite said forward direction relative to said second shift member part; wherein said first shift member part has said pin thereon; and wherein said transmission means drivingly couples said driving member to said second shift member part.

4. The drive apparatus according to claim 3, wherein said ratchet means includes an annular, radially outwardly facing saw tooth surface provided on said second shift member part, a ratchet element supported on said first shift member part for movement toward and away from said saw tooth surface, and resilient means for yieldably urging said ratchet element into engagement with said saw tooth surface.

5. The drive apparatus according to claim 2, wherein said pin is substantially cylindrical, and wherein said one side of said slot has a plurality of shallow, axially spaced arcuate recesses.

6. The drive apparatus according to claim 2, wherein said slot has a centerline which is skewed with respect to said axis of said wheel.

7. The drive apparatus according to claim 6, wherein a line which extends parallel to said axis of said wheel and which intersects said centerline of said slot forms an angle of approximately 25° with respect to said centerline of said slot.

8. The drive apparatus according to claim 6, wherein the surfaces of said pin engageable with said slot are substantially cylindrical, and wherein said one side of said slot has a plurality of shallow, axially spaced arcuate recesses.

9. The drive apparatus according to claim 8, including resilient means for yieldably urging said shift member to rotate in said forward direction relative to said hub.

10. The drive apparatus according to claim 9, wherein said hub includes a sleevelike spindle portion which concentrically encircles said axis and an annular flange portion extending radially outwardly from one end of said spindle portion, said cylindrical wall portion of said hub being of greater diameter than and concentrically encircling said spindle portion of said hub and being connected at one axial end to a radially outer end of said annular flange portion; and wherein said shift member has a central opening therethrough with an inside diameter approximately equal to the outside diameter of said spindle portion of said hub, said spindle portion of said hub being slidably received in said opening in said shift member and thereby rotationally and axially movably supporting said shift member on said spindle portion of said hub.

11. The drive apparatus according to claim 10, wherein said means for drivingly coupling said driving member to said shift member includes said shift member having first and second axially spaced sprockets thereon, said first sprocket havinq a diameter larger than that of said second sprocket; and wherein said driving member is an endless chain supported for lengthwise movement in a manner so that it is held against axial movement relative to said wheel and can drivingly engage a respective one of said first and second sprockets which is axially aligned therewith, said first and second sprockets being axially aligned with said chain when said shift member is respectively in its first and second positions; and wherein when said first and second sprockets are axially aligned with said chain said pin on said shift member is axially aligned with a respective one of said arcuate recesses in said slot.

12. The drive apparatus according to claim 11, wherein said vehicle is a bicycle.

13. The drive apparatus according to claim 10, wherein said means responsive to the rotational speed of said wheel includes said wheel having a plurality of spokes extending outwardly from said hub, includes a centrifugal weight radially movably supported on one of said spokes, and includes an elongate flexible element having one end secured to said centrifugal weight and its other end secured to said shift member, said elongate element extending generally radially inwardly from said centrifugal weight, then over guide means provided on said annular flange portion of said hub at a location spaced axially from said shift member, and then axially to said shift member; wherein said resilient means includes a helical spring which coaxially encircles said spindle portion of said hub and has its ends respectively fixedly supported on said shift member and said hub, said helical spring yieldably urging said shift member to move relative to said hub in said forward direction and wherein said means responsive to the rotational speed of said wheel includes said helical spring yieldably urging said shift member to move relative to said hub in an axial direction away from said guide means on said hub.

14. The drive apparatus according to claim 13, wherein said shift member has a radially outwardly facing cylindrical surface which is adjacent and spaced a small radial distance from a radially inwardly facing cylindrical surface on said cylindrical wall portion of said hub, said pin on said shift member projecting radially outwardly from said cylindrical surface thereon; and wherein said transmission means includes a first sleevelike belllows seal which encircles said helical spring and has its ends respectively supported on said shift member and said hub, and a second sleevelike bellows seal which encircles a portion of said spindle portion of said hub at an end thereof remote from said annular flange portion and which has its ends respectively supported on said end portion of said spindle portion and said shift member.

15. The drive apparatus according to claim 13, wherein said guide means includes a generally semi-cylindrical surface provided on said annular flange portion of said hub and includes an opening provided through said annular flange portion of said hub at a location immediately radially inwardly of said semi-cylindrical surface, said elongate element extending slidably over said semi-cylindrical surface and then through said opening in said annular flange portion of said hub.

16. The drive apparatus according to claim 1, wherein said torque responsive means is responsive to increases and decreases in the torque applied by said driving member to said wheel through said transmission means for producing increasing and decreasing resistance to a decrease in said drive ratio by said variable drive ratio means, and is responsive to a large torque applied by said driving member to said wheel through said transmission means for urging said variable drive ratio means to increase the drive ratio.

* * * * *